(12) United States Patent
Hyun et al.

(10) Patent No.: US 10,317,764 B2
(45) Date of Patent: Jun. 11, 2019

(54) METHOD AND ELECTRONIC DEVICE FOR EXECUTING SCREEN SECURITY FUNCTION

(71) Applicant: SAMSUNG ELECTRONICS CO., LTD., Suwon-si, Gyeonggi-do (KR)

(72) Inventors: Seungjun Hyun, Seoul (KR); Minseok Kang, Hwaseong-si (KR); Byungchang Kwak, Seoul (KR); Junho Park, Yongin-si (KR); Jinhee Ahn, Suwon-si (KR); Hyunyoung Yang, Seoul (KR); Seungmin Choi, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 59 days.

(21) Appl. No.: 15/447,433

(22) Filed: Mar. 2, 2017

(65) Prior Publication Data

US 2017/0255036 A1    Sep. 7, 2017

(30) Foreign Application Priority Data

Mar. 3, 2016  (KR) .................. 10-2016-0025732

(51) Int. Cl.
   *G02F 1/1333*    (2006.01)
   *G02F 1/1335*    (2006.01)
   (Continued)

(52) U.S. Cl.
   CPC ............ *G02F 1/137* (2013.01); *G02F 1/1334* (2013.01); *G02F 1/13338* (2013.01); *G02F 1/133504* (2013.01); *G06F 3/0346* (2013.01); *G06F 3/041* (2013.01); *G06F 3/0488* (2013.01); *G06F 21/84* (2013.01); *G02F 2203/03* (2013.01)

(58) Field of Classification Search
   CPC ............... G02F 1/13338; G02F 1/1334; G02F 1/133504
   See application file for complete search history.

(56) References Cited

U.S. PATENT DOCUMENTS

2010/0182673 A1    7/2010  Jang et al.
2012/0139897 A1*   6/2012  Butler .................... G06F 3/041
                                                    345/419
(Continued)

FOREIGN PATENT DOCUMENTS

KR    10-2013-0058487    6/2013
KR    10-1404380         6/2014
(Continued)

*Primary Examiner* — Phu Vu
(74) *Attorney, Agent, or Firm* — Nixon & Vanderhye P.C.

(57) ABSTRACT

The present disclosure relates to a method and an electronic device for executing a screen security function. The electronic device includes a display unit comprising a view angle limit panel disposed on a display panel, a sensor unit including at least one sensor, and a processor. The electronic device can receive a screen security execution command, identify a direction of the electronic device using the sensor unit functionally connected to the processor, determine a view angle limit direction based on the identified direction of the electronic device using the processor, and supply an electric current to the view angle limit panel based on the determined view angle limit direction using the view angle limit panel functionally connected to the processor.

16 Claims, 13 Drawing Sheets

(51) Int. Cl.
*G02F 1/137* (2006.01)
*G02F 1/1334* (2006.01)
*G06F 3/041* (2006.01)
*G06F 21/84* (2013.01)
*G06F 3/0488* (2013.01)
*G06F 3/0346* (2013.01)

(56) References Cited

U.S. PATENT DOCUMENTS

| | | | |
|---|---|---|---|
| 2014/0009377 A1* | 1/2014 | Shibazaki | G09G 3/36 |
| | | | 345/102 |
| 2014/0085341 A1 | 3/2014 | Shin et al. | |
| 2015/0180116 A1* | 6/2015 | Sato | H01Q 21/24 |
| | | | 343/841 |
| 2015/0268478 A1 | 9/2015 | Kim | |
| 2016/0180116 A1* | 6/2016 | Kim | G06F 21/84 |
| | | | 726/34 |

FOREIGN PATENT DOCUMENTS

| KR | 10-1557799 | 9/2015 |
|---|---|---|
| KR | 10-2015-0108989 | 10/2015 |

* cited by examiner

METHOD AND ELECTRONIC DEVICE FOR EXECUTING SCREEN SECURITY FUNCTION

CROSS-REFERENCE TO RELATED APPLICATION

This application is based on and claims priority under 35 U.S.C. § 119 to a Korean patent application filed on Mar. 3, 2016 in the Korean Intellectual Property Office and assigned Serial number 10-2016-0025732, the disclosure of which is hereby incorporated by reference herein in its entirety.

TECHNICAL FIELD

The present disclosure relates generally to a method and an electronic device for executing a screen security function.

BACKGROUND

In accordance with technological developments, electronic devices (for example, smart phones) having a display screen are being developed to show images clearly at any view angle. The electronic devices provide users with the ability to identify images from a wider view angle. However, electronic devices providing a screen with a wide view angle may have a problem in protecting personal information in a public place. For example, when the electronic device is in a public place such as a subway, bus, and airport, personal information or security information can be exposed to neighboring persons because the screen has a wide view angle. In particular, in case of performing a banking-related function (for example, password input of internet banking and input of public authentication information) by using an electronic device, security measures are necessary for screens having a wide view angle. As electronic devices having a display are being used more frequently, the necessity of screen security for electronic devices is increasing.

As a method for limiting a view angle of a display, a security film can be attached to a display of an electronic device. The security film can be attached to an external side of the display of the electronic device, i.e., on a glass surface. The electronic device attached with a security film may have decreased clarity and view angle of the display. If the security film is attached to an electronic device once, it may be difficult to remove the security film. Although a user can select an appropriate security film for a security function, it may be difficult to remove the security film afterward. Further, because the attached security film limits a view angle in a basic direction, the view angle cannot be limited efficiently or the image quality can be depleted if a display direction of the electronic device (for example, a vertical or horizontal direction) changes.

SUMMARY

Various example embodiments of the present disclosure can provide a method so that the user can enable or disable a screen security function of an electronic device selectively using a view angle limit panel that can adjust the transparency of a display based on an electric power supply.

An electronic device according to various example embodiments of the present disclosure may include a sensor unit configured to identify a direction of the electronic device; a display unit comprising a display panel including a view angle limit panel disposed on the display panel; and a processor configured to receive a screen security execution command, to identify the direction of the electronic device using the sensor unit, to determine a view angle limit direction based on the identified direction of the electronic device, and to supply an electric current to the view angle limit panel based on the determined view angle limit direction.

An electronic device according to various example embodiments of the present disclosure may include a display unit comprising a touch panel, a display panel, and a view angle limit panel wherein the view angle limit panel is disposed on the display panel; and a processor configured to receive a screen security execution command, to supply an electric current to the view angle limit panel in response to the screen security execution command, to detect a user input through the touch panel, and to shut off the electric current supplied to a point corresponding to the detected user input.

A method of operating an electronic device having a display unit comprising a view angle limit panel disposed on a display panel, a sensor unit, and a processor according to various example embodiments of the present disclosure may include receiving a screen security execution command, identifying a direction of the electronic device using the sensor unit functionally connected to the processor, determining a view angle limit direction based on the identified direction of the electronic device using the processor, and supplying an electric current to the view angle limit panel based on the determined view angle limit direction using the view angle limit panel functionally connected to the processor.

The electronic device according to various example embodiments of the present disclosure can perform a screen security function without influencing the usability of a display of the electronic device when the screen security is required. The screen security function may be a function of limiting a screen view angle of the electronic device. Various example embodiments of the present disclosure can control to enable or disable the screen security function easily and quickly for a user. The electronic device according to the present disclosure can control a view angle limit direction based on a screen direction. For example, if the screen of the electronic device is in the horizontal direction (for example, landscape mode), the electronic device can determine the view angle limit direction corresponding to the horizontal direction. Various example embodiments of the present disclosure perform the screen security function based on the screen direction of the electronic device, and thereby can provide a more improved screen security function for a user.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
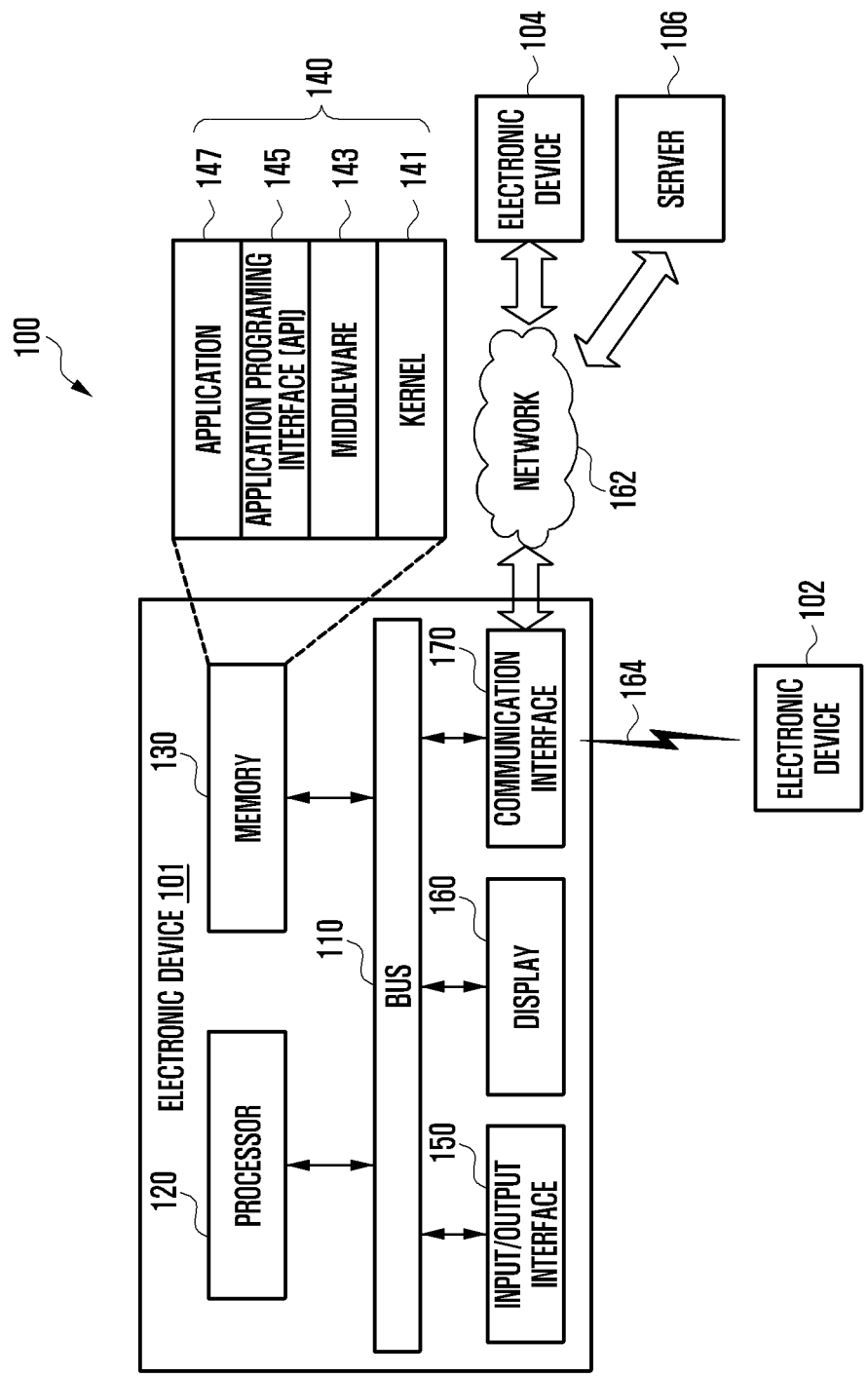
FIG. 1 is a diagram illustrating an example network environment including an electronic device according to various example embodiments of the present disclosure.

Hereinafter, various example embodiments of the present disclosure is described with reference to the accompanying drawings. Although specific embodiments are illustrated in the drawings and related detailed descriptions are discussed in the present disclosure, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. On the other hand, when it is stated that a component is "directly coupled to" or "directly connected to" another component, a new component does not exist between the component and another component.

In the present disclosure, the expression "configured (or set) to do" may be used interchangeably with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

An electronic device according to various example embodiments of the present disclosure may be a device including an antenna. For example, the electronic device may be one or more of the following: a smart phone, a tablet Personal Computer (PC), a mobile phone, a video phone, an e-book reader, a desktop PC, a laptop PC, a netbook computer, a Personal Digital Assistant (PDA), Portable Multimedia Player (PMP), MP3 player, a mobile medical application, a camera, and a wearable device (for example, a Head-Mounted-Device (HMD), such as electronic glasses, electronic clothes, an electronic bracelet, an electronic necklace, an electronic appcessary, an electronic tattoo, and a smart watch), or the like, but is not limited thereto.

According to some embodiments, the electronic device may be a smart home appliance having an antenna. The smart home appliance may include at least one of the following: a Television (TV), a Digital Video Disk (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, and an electronic frame, or the like, but is not limited thereto.

According to some embodiments, the electronic device may include at least one of the following: various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops, or the like, but is not limited thereto.

According to some embodiments, the electronic device may include at least one of the following: furniture or a part of a building/structure, an electronic board, an electronic signature receiving device, a projector, and various types of measuring devices (for example, a water meter, an electricity meter, a gas meter, a radio wave meter and the like), or the which are equipped with an antenna, but are not limited thereto. The electronic device according to various embodiments of the present disclosure may also be a combination of the devices listed above. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments will be discussed with reference to the accompanying drawings. The term se skilled in the art that the electronic device according to various embodiments of the present meter and the e (e.g., an artificial intelligence electronic device) using an electronic device.

FIG. 1 is a diagram illustrating an example network environment 100 including an electronic device 101 according to various example embodiments of the present disclosure. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to some embodiments, at least one of the above described components may be omitted from the electronic device 101 or another component may be further included in the electronic device 101.

The bus 110 may be a circuit connecting the above described components 120, 130, and 150~170 and transmitting communications (e.g., control messages and/or data) between the above described components.

The processor 120 may include various processing circuitry, such as, for example, and without limitation, one or more of the following: a dedicated processor, a central processing unit (CPU), an application processor (AP), and a communication processor (CP). The processor 120 is capable of controlling at least one of other components of the electronic device 101 and/or processing data or operations related to communication.

The memory 130 is capable of including volatile memory and/or non-volatile memory. The memory 130 is capable of storing data or commands related to at least one of other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS).

The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests.

The API 145 refers to an interface configured to allow the application programs 147 to control functions provided by the kernel 141 or the middleware 143. The API 145 is capable of including at least one interface or function (e.g., instructions) for file control, window control, image process, text control, or the like.

The input/output interface 150 may include various input/output circuitry that is capable of transferring instructions or data, received from the user or external devices, to one or more components of the electronic device 101. The input/output interface 150 is capable of outputting instructions or data, received from one or more components of the electronic device 101, to the user or external devices.

The display 160 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, or the like, but is not limited thereto. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 may include various communication circuitry and is capable of establishing communication between the electronic device 101 and an external device (e.g., a first external device 102, a second electronic device 104, or a server 106). For example, the communication interface 170 is capable of communicating with an external device (e.g., a second external device 104 or a server 106) connected to the network 162 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-range wireless communication 164. Short-range wireless communication 164 may include at least one of the following: wireless fidelity (WiFi), Bluetooth (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called "Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The first and second external electronic devices 102 and 104 are each identical to or different from the electronic device 101, in terms of type. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from other electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
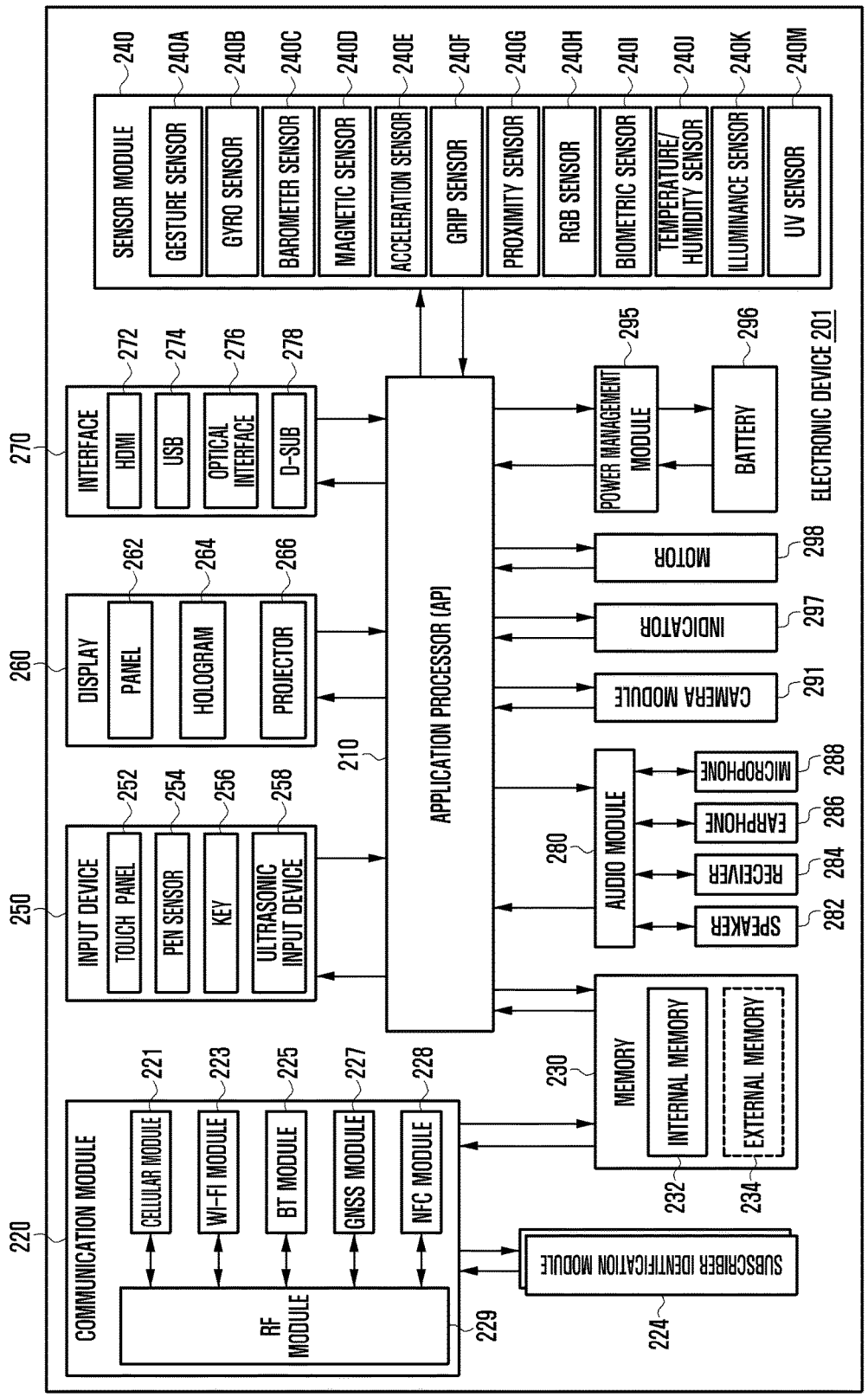
FIG. 2 is a block diagram illustrating an example electronic device according to various example embodiments of the present disclosure.

FIG. 2 is a block diagram illustrating an example electronic device 201 according to various example embodiments. For example, the electronic device 201 is capable of including part or all of the components in the electronic device 101 shown in FIG. 1. The electronic device 201 is capable of including one or more processors (e.g., including processing circuitry) 210 (e.g., Application Processors (APs)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 illustrated in FIG. 1. For example, the communication module 170 may include various communication circuitry, such as, for example, and without limitation, a cellular module 221, WiFi module 223, Bluetooth (BT) module 225, GNSS module 227 (e.g., a GPS module, Glonass module, Beidou module or Galileo module), NFC module 228, and Radio Frequency (RF) module 229.

The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 1721 is also capable of including a communication processor (CP).

Each of the WiFi module 223, the BT module 225, the GNSS module 227, and the NFC module 228 is capable of including a processor for processing data transmitted or received through the corresponding module. According to embodiments, at least part of the cellular module 221, WiFi module 223, BT module 225, GNSS module 227, and NFC module 228 (e.g., two or more modules) may be included in one integrated chip (IC) or one IC package.

The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 227, and NFC module 228 is capable of transmission/reception of RF signals through a separate RF module.

The SIM module 224 is capable of including a card including a subscriber identification module (SIM) and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in memory 232 and/or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure (e.g., barometer) sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 may include various input circuitry, such as, for example, and without limitation, a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user.

The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
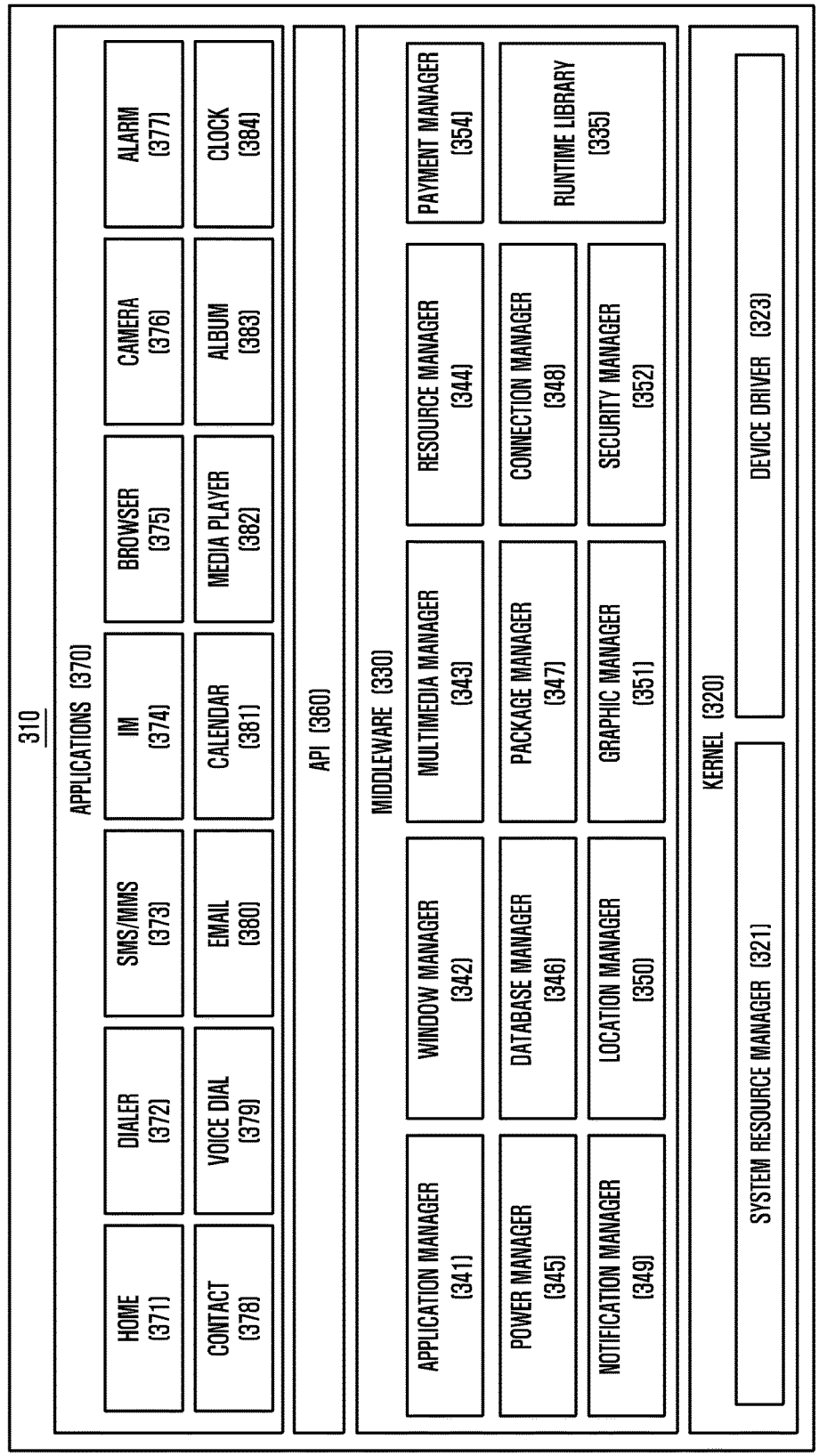
FIG. 3 is a block diagram illustrating an example program module according to various example embodiments of the present disclosure.

FIG. 3 is a block diagram illustrating an example programming module according to various example embodiments. According to an example embodiment, the program module 310 (e.g., program module 140 illustrated in FIG. 1) is capable of including an operation system (OS) for controlling resources related to the electronic device (e.g., electronic device 101) and/or various applications (e.g., application programs 147 illustrated in FIG. 1) running on the OS. The OS may be Android, iOS, Windows, Symbian, Tizen, Bada, etc.

The program module 310 may include, for example, a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver.

The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a Basic Input/Output System (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, dialer 372, SMS/MMS 373, instant message (IM) 374, browser 375, camera 376, alarm 377, contact 378, voice dial 379, email 380, calendar 381, media player 382, album 383, and clock 384. Various other applications, not shown in FIG. 3, may be included, such as, for example, and without limitation, health care (e.g., an application for measuring amount of exercise, blood sugar level, etc.), and environment information (e.g., an application for providing atmospheric pressure, humidity, temperature, etc.).

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user.

The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems.

According to various embodiments, at least part of the program module 310 can be implemented with software, firmware, hardware, or any combination of two or more of them. At least part of the program module 310 can be implemented (e.g., executed) by a processor (e.g., processor 210). At least part of the programing module 310 may include modules, programs, routines, sets of instructions or processes, etc., in order to perform one or more functions.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

Figure 4:
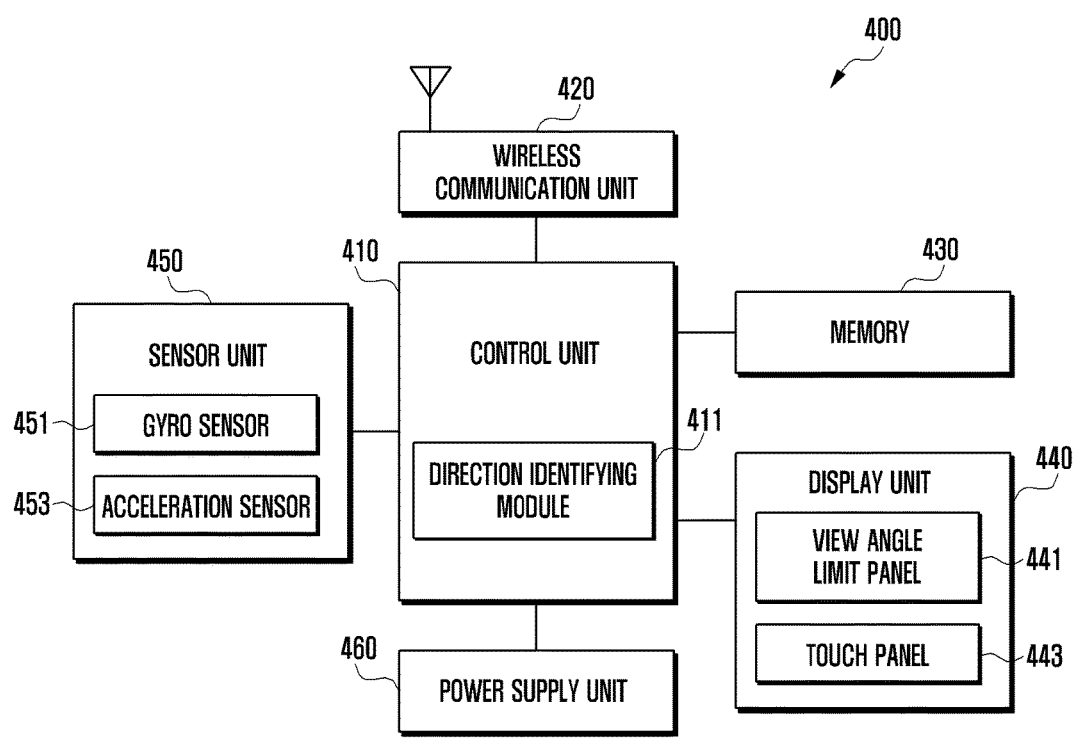
FIG. 4 is a block diagram illustrating an example electronic device according to various example embodiments of the present disclosure.

FIG. 4 is a block diagram illustrating an example electronic device according to various example embodiments of the present disclosure.

With reference to FIG. 4, the electronic device 400 (electronic device 201 of FIG. 2) may include a control unit (e.g., including processing circuitry) 410, wireless communication unit (e.g., including communication circuitry) 420, memory 430, display unit 440, sensor unit 450, and power supply unit 460.

The control unit 410 may include various processing circuitry and program elements that can control a plurality of hardware or software components connected to the control unit 410 by driving an operating system or an application program. The control unit 410 may be the same as the processor 210 of FIG. 2. The control unit 410 can control a wireless communication unit 420, memory 430, display unit 440, sensor unit 450, and power supply unit 460. For example, the control unit 410 can perform wireless communication with an external device by controlling the wireless communication unit 420 and can load data stored in the memory 430 or save data in the memory 430. If a screen security execution command is received, the control unit 410 according to various embodiments of the present disclosure can perform a screen security function by controlling the display unit 440. Further, the control unit 410 can identify a direction of the display unit 440 of the electronic device 400 (for example, direction of the electronic device 400) based on a sensor value measured by the sensor unit 450 and can perform a screen security function corresponding to the identified direction of the display unit 440.

The control unit 410 may include various circuitry and program elements configured to provide a direction identifying module 411. The direction identifying module 411 can identify a direction of the electronic device 400. For example, the control unit 410 can transmit a sensor value measured by the sensor unit 450 to the direction identifying module 411. The direction identifying module 411 can identify the direction of the electronic device 400 based on the received sensor value. The electronic device 400 can distinguish a landscape mode or a portrait mode based on a direction displayed in the display unit 440. The direction identifying module 411 can identify a direction of the electronic device 400 so that a screen security function can be executed based on the direction of the electronic device 400.

The wireless communication unit 420 may correspond to the communication module 220 of FIG. 2, and may include various communication circuitry that can perform a wireless communication function so that electronic device 400 can communicate with an external device.

The memory 430 may correspond to the memory 230 of FIG. 2. The memory 430 can store a reference value so that the direction identifying module 411 can identify a direction of the electronic device 400. The reference value may be used for a comparison with a value measured by the sensor unit 450. The direction identifying module 411 can identify a direction of the electronic device 400 based on the value measured by the sensor unit 450 and the reference value stored in the memory 430.

The display unit 440 may correspond to the display 260 of FIG. 2. The display unit 440 can display an image via a display panel under the control of the control unit 410. The display unit 440 may be include a plurality of panels such as a view angle limit panel 441 and a touch panel 443 (touch panel 252 of FIG. 2). The view angle limit panel 441 can limit a user's view angle based on a received electric current supply. For example, the view angle limit panel 441 can prevent and/or reduce a partial area of the display from receiving light. Protecting a partial area of the display may refer, for example, to a situation in which a user's view angle is limited corresponding to the partial area. The touch panel 443 can detect coordinates corresponding to a user input. The control unit 410 according to various embodiments of the present disclosure can disable the screen security function for the coordinates detected by the touch panel 443.

The sensor unit 450 may correspond to the sensor module 240 of FIG. 2. The sensor unit 450 may include various sensors that can measure a sensor value under the control of the control unit 410. The sensor unit 450 may include a plurality of sensors such as a gyro sensor 451 (gyro sensor 240B of FIG. 2) and an acceleration sensor 453 (acceleration sensor 240E of FIG. 2). The control unit 410 can measure sensor values through the gyro sensor 451 and the acceleration sensor 453 and identify a direction of the electronic device 400 based on the measured sensor values. With reference to FIG. 4, only the gyro sensor 451 and the acceleration sensor 453 are shown; however, the present disclosure is not limited to this configuration.

The power supply unit 460 may correspond to the power management module 295 of FIG. 2. The power supply unit 460 may include a power supply that can supply an electric current to each component of the electronic device 400 under the control of the control unit 410. The control unit 410 can control an electric current supplied from the power supply unit 460 to each component of the electronic device 400 and perform a screen security function by supplying the electric current to the view angle limit panel 441.

An electronic device according to various example embodiments of the present disclosure may include a sensor unit configured to identify a direction of the electronic device; a display unit including a view angle limit panel disposed on a display panel; and a processor configured to receive a screen security execution command, to identify the direction of the electronic device using the sensor unit, to determine a view angle limit direction based on the identified direction of the electronic device, and to supply an electric current to the view angle limit panel based on the determined view angle limit direction.

In various embodiments of the present disclosure, the processor may be configured to supply the electric current to a specific area of the view angle limit panel corresponding to the Y-axis direction based on the identified direction of the electronic device.

In various embodiments of the present disclosure, the specific area of the view angle limit panel may include a plurality of areas which are disposed at regular intervals corresponding to the X-axis direction.

In various embodiments of the present disclosure, the view angle limit panel may include a plurality of liquid crystal molecules arranged in a certain direction if the electric current is supplied.

In various embodiments of the present disclosure, the view angle limit panel may comprise a PDLC (polymer dispersed liquid crystal) panel.

An electronic device according to various example embodiments of the present disclosure may include a display unit including a touch panel, a display panel, and a view angle limit panel wherein the view angle limit panel is disposed on the display panel and a processor configured to receive a screen security execution command, to supply an electric current to the view angle limit panel in response to the screen security execution command, to detect a user input through the touch panel, and to shut off the electric current supplied to a point corresponding to the detected user input.

In various embodiments of the present disclosure, the processor may be configured to identify coordinates of the user input and to shut off the electric current corresponding to the identified coordinates.

In various embodiments of the present disclosure, the processor may be configured to identify an area having a predetermined radius with the identified coordinates as the center and to shut off the electric current corresponding to the identified area.

In various embodiments of the present disclosure, the processor may be configured to shut off the electric current corresponding to the identified coordinates and to re-supply the electric current after a predetermined time has elapsed.

Figure 5A:
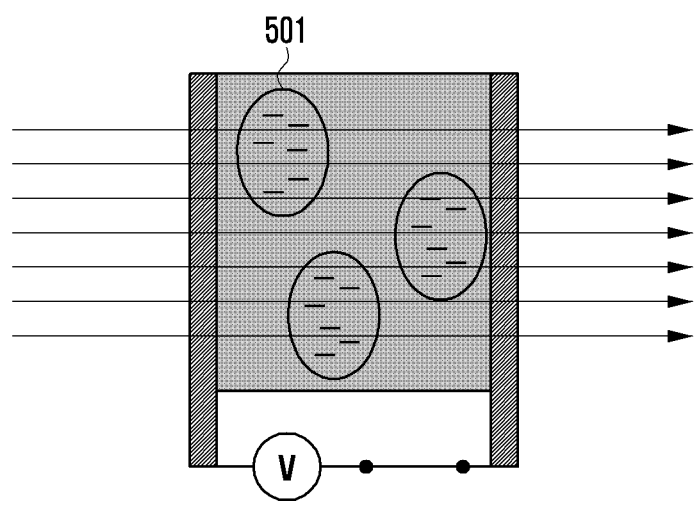
FIGS. 5A and 5B are diagrams illustrating an example of the operation principal of PDLC technology according to various example embodiments of the present disclosure.
Figure 5B:
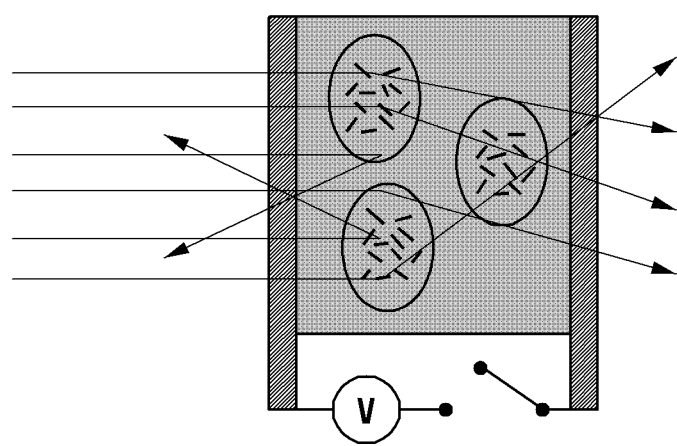

FIGS. 5A and 5B are diagrams illustrating an example of the operation principal of PDLC technology according to various example embodiments of the present disclosure.

FIGS. 5A and 5B illustrate molecules configured in, for example, a PDLC (polymer dispersed liquid crystal) panel. FIG. 5A illustrates a state that an electric current is supplied to the PDLC panel, and FIG. 5B illustrates a state that the electric current is not supplied to the PDLC panel. The PDLC panel may be configured with a plurality of liquid crystal balls 501 including liquid crystal molecules.

With reference to FIG. 5A, if an electric current is supplied to the PDLC panel, the liquid crystal molecules included in the liquid crystal ball 501 can be arranged in a specific direction. In this case, incident light penetrates the PDLC panel while maintaining an incident direction. Namely, if an electric current is supplied to the PDLC panel, the electronic device displays a screen with a transparent image.

With reference to FIG. 5B, if an electric current is not supplied to the PDLC panel, the liquid crystal molecules included in the liquid crystal ball 501 may be arranged in random directions. In this case, incident light to the PDLC panel scatters based on the arrangement of the liquid crystal molecules in random directions. Namely, if an electric current is not supplied to the PDLC panel, the screen of the electronic device displays an image opaquely. Because the incident light scatters through the PDLC panel, the screen of the electronic device displays an image opaquely and a user may see an opaque screen.

In the above description, it has been explained that the screen is displayed transparently if an electric current is supplied and opaquely if the electric current is not supplied; however, the present disclosure is not limited to the above description. For example, the screen can be displayed opaquely if an electric current is supplied and transparently if an electric current is not supplied. According to various example embodiments of the present disclosure, the screen can be displayed opaquely by supplying an electric current only when a user desires. Accordingly, consumption of electric power can be reduced.

Figure 6:
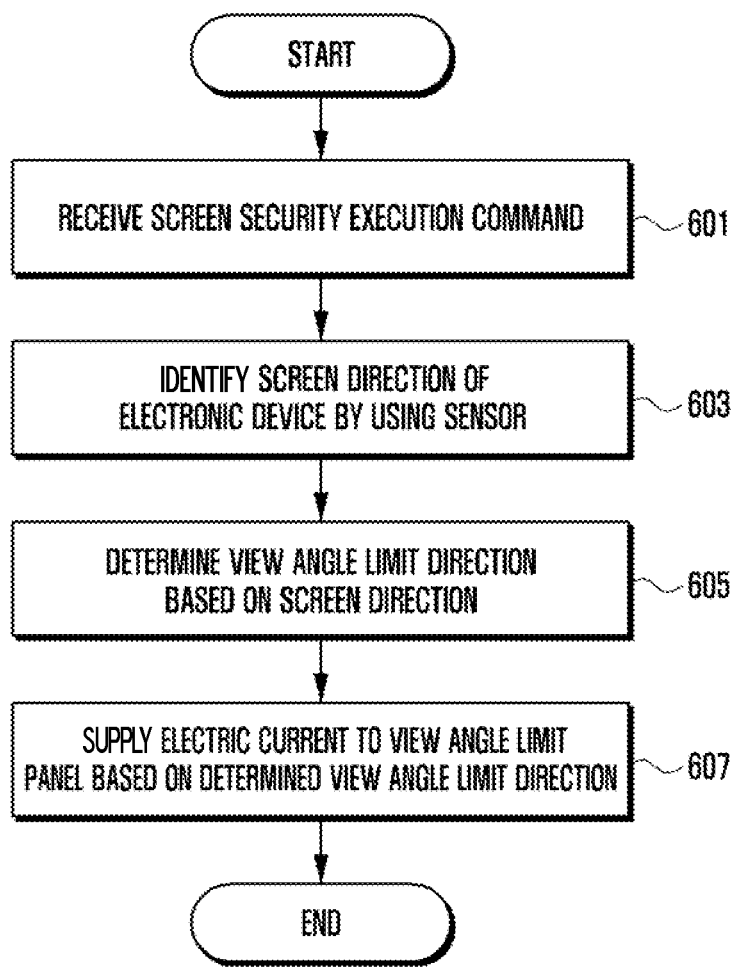
FIG. 6 is a flowchart illustrating an example method for executing a screen security function based on a screen direction of an electronic device according to various example embodiments of the present disclosure.

FIG. 6 is a flowchart illustrating an example method for executing a screen security function based on a screen direction of an electronic device according to various example embodiments of the present disclosure.

With reference to FIG. 6, a processor (processor 210 of FIG. 2) of the electronic device (electronic device 201 of FIG. 2) receives a screen security execution command at operation 601. The processor 210 can receive the screen security execution command corresponding to a user input. The screen security execution command can be received from an input device (input device 250 of FIG. 2) of the electronic device 201. Here, the screen security function may include an operation of displaying the screen opaquely to limit a view angle of the screen. For example, the processor 210 can display a screen opaquely by controlling the transparency of the screen. The processor 210 can adjust a level of opacity by changing gradually a transparency setting value. The transparency setting value can be determined by a developer or a user.

The processor 210 identifies a screen direction of the electronic device 201 by using a sensor module (sensor module 240 of FIG. 2) at operation 603. The screen direction of the electronic device 201 means a direction in which the screen is displayed, and it may be the same as the direction of the electronic device 201. The processor 210 of the electronic device 201 can distinguish a landscape mode and a portrait mode as a direction of the electronic device 201 based on the screen direction. In more detail, the processor 210 can identify a screen direction of the electronic device 201 by using a gyro sensor 240B, acceleration sensor 240E, and grip sensor 240F included in the sensor module 240. For example, the processor 210 can identify a rotation direction of the electronic device 201 through the gyro sensor 240B and the acceleration sensor 240E, and it can identify the screen direction of the electronic device 201 based on the rotation direction. The processor 210 can identify a location of a user's hand gripping the electronic device 201 through the grip sensor 240F, and it can identify the screen direction of the electronic device 201 based on the location of the user's hand.

The processor 210 determines at operation 605 a view angle limit direction based on the identified screen direction. For example, if the screen direction of the electronic device 201 is the vertical direction, the view angle limit direction can be determined corresponding to the vertical direction. If the screen direction of the electronic device 201 is the horizontal direction, the view angle limit direction can be determined corresponding to the horizontal direction. The view angle limit direction will be described in more detail with reference to FIG. 7B. A state that the screen of the electronic device 201 is in the vertical direction may be called portrait mode and a state that the screen of the electronic device 201 is in the horizontal direction may be called landscape mode.

The processor 210 supplies at operation 607 an electric current to the view angle limit panel based on the determined view angle limit direction. The view angle limit panel may be the same as the view angle limit panel 441 of FIG. 4. The processor 210 can scatter light in a partial area of the view angle limit panel 441 by supplying an electric current to the view angle limit panel 441. Namely, liquid crystal molecules in a partial area of the view angle limit panel 441 can be arranged in random directions and the light passing through the partial area of the view angle limit panel 441 can be scattered. The processor 210 can adjust a light scattering level of the liquid crystal molecules by adjusting the electric current supplied to the view angle limit panel 441. Namely, the processor 210 can adjust the transparency of the screen by adjusting the light scattering level. If the light scatters at a partial area of the view angle limit panel 441, the view angle of the electronic device 201 can be limited. In more detail, the view angle in which the screen of the electronic device 201 can be identified becomes narrower. For example, information displayed on the screen can be easily identified from the front side of the electronic device 201; however, it may be difficult to identify the information displayed on the screen from the outer area of the front view angle. A state that the view angle of the screen is limited by supplying an electric current may be a state that the screen security function is being executed. The operation of limiting the view angle of the screen will be described in more detail with reference to FIGS. 8A and 8B.

Figure 7A:
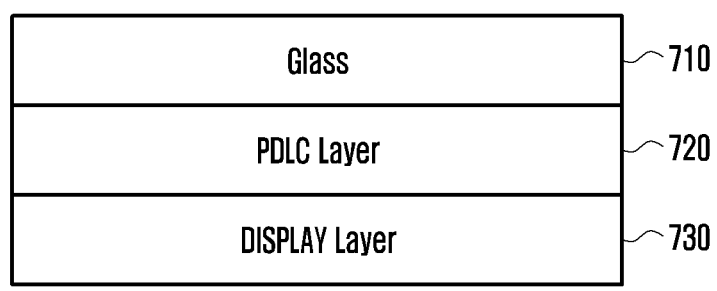
FIG. 7A is a diagram illustrating an example of a PDLC panel included in a display of an electronic device according to various example embodiments of the present disclosure.

FIG. 7A is a diagram illustrating an example of a PDLC panel included in a display of an electronic device according to various example embodiments of the present disclosure.

FIG. 7A illustrates a structure of panel 262 included in the display 260 of the electronic device 201 according to various embodiments of the present disclosure. A PDLC layer 720 (for example, view angle limit panel) may be disposed on a display layer 730 (for example, display panel) and a glass 710 may be disposed on the PDLC layer 720. Although not shown in the drawing, a backlight device may be located under the display layer 730. Further, a touch panel may be located between the above layers. Generally, by utilizing the PDLC technology, the PDLC layer 720 may be located under the display layer 730 and can scatter the light emitted by the backlight device. Because the general PDLC structure scatters the light emitted by the backlight, an image can be displayed opaquely in the display layer 730, and accordingly in the display 260. According to various embodiments of the present disclosure, an image can be displayed clearly in the display layer 730 through a transparent screen because the PDLC layer 720 is located on the display layer 730. The electronic device 201 according to various embodiments of the present disclosure can supply an electric current so that a partial area of the PDLC layer 720 scatters light in a state of displaying a transparent image on the display 260. Namely, the electronic device 201 can scatter light in a partial area of the PDLC layer 720 in a state of displaying an image properly in the display 260. Accordingly, the electronic device 201 can provide an effect of narrowing a view angle of a screen displayed in the display 260. According to various embodiments of the present disclosure, the screen view angle can be limited by locating the PDLC layer 720 on the display layer 730 and by controlling light scattering in a partial area of the PDLC layer 720.

According to various embodiments of the present disclosure, a view angle of an image displayed in the display 260 can be limited by controlling light scattering in a partial area of the PDLC layer 720 included in the display 260.

Figure 7B:
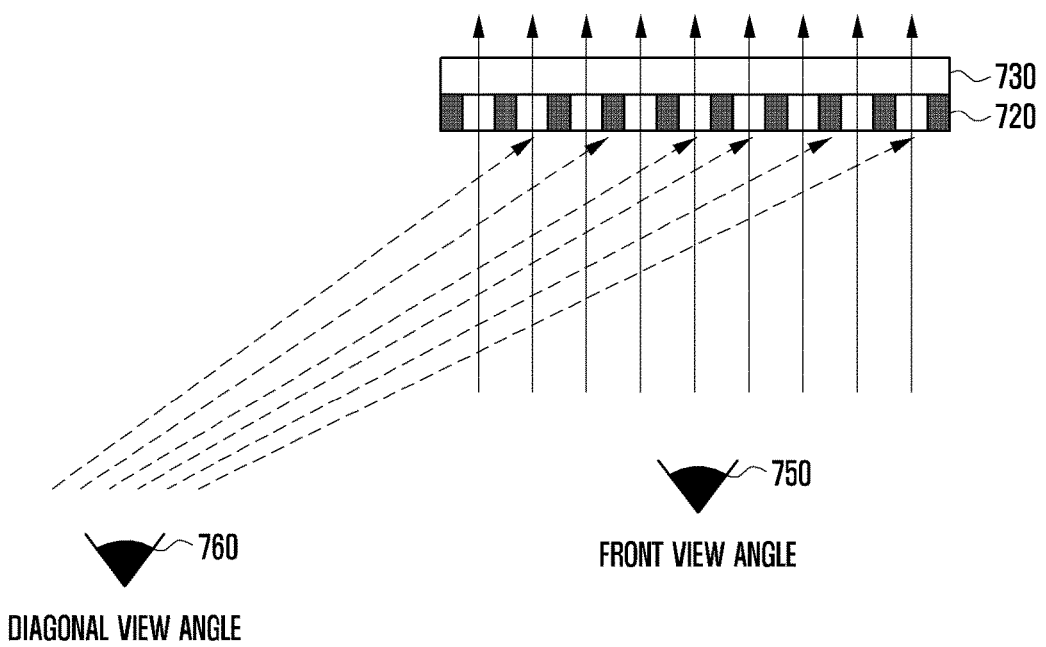
FIG. 7B is a diagram illustrating an example of the principal for limiting a view angle according to various example embodiments of the present disclosure.

FIG. 7B is a diagram illustrating an example of the principal for limiting a view angle according to various example embodiments of the present disclosure.

With reference to FIG. 7B, a first user watches a screen of the electronic device 201 (for example, display layer 730) at the front side and a second user watches the screen of the electronic device 201 at the left side. A front view angle 750 of FIG. 7B may be a view angle at which the first user watches the screen of the electronic device 201, and a diagonal view angle 760 of FIG. 7B may be a view angle at which the second user watches the screen of the electronic device 201. The electronic device 201 according to various embodiments of the present disclosure may be in a state that the PDLC layer 720 is located on the display layer 730 and light is scattered in a specific area of the PDLC layer 720. The electronic device 201 can provide an opaque screen according to the user's view angle because light is scattered in a specific area of the PDLC layer 720. The electronic device 201 can provide an opaque display with a predetermined angle range for a user who watches the electronic device at a location displaced from the front of the electronic device.

With reference to FIG. 7B, the processor 210 of the electronic device 201 can control light scattering at predetermined intervals corresponding to the Y-axis direction (vertical direction) of the PDLC layer 720. In this case, the electronic device 201 may be in a portrait mode. Namely, the processor 210 can perform a screen security function by limiting a screen view angle. As illustrated in FIG. 7B, if light of a specific area of the PDLC layer 720 is scattered at predetermined intervals corresponding to the Y-axis direction of the PDLC layer 720, the view of the screen of the electronic device 201 can be limited for the second user who watches the electronic device 201 at the diagonal view angle 760. The electronic device 201 can limit a view angle so that persons located at the right or left side of the first user can hardly identify a screen by scattering the light of a specific area of the PDLC layer 720 at predetermined intervals corresponding to the Y-axis direction of the PDLC layer 720. According to various embodiments of the present disclosure, a level of light scattering can be controlled for a specific area of the PDLC layer 720. The processor 210 of the electronic device 201 can control the transparency (or opacity) for a specific area of the PDLC layer 720.

Figure 8A:
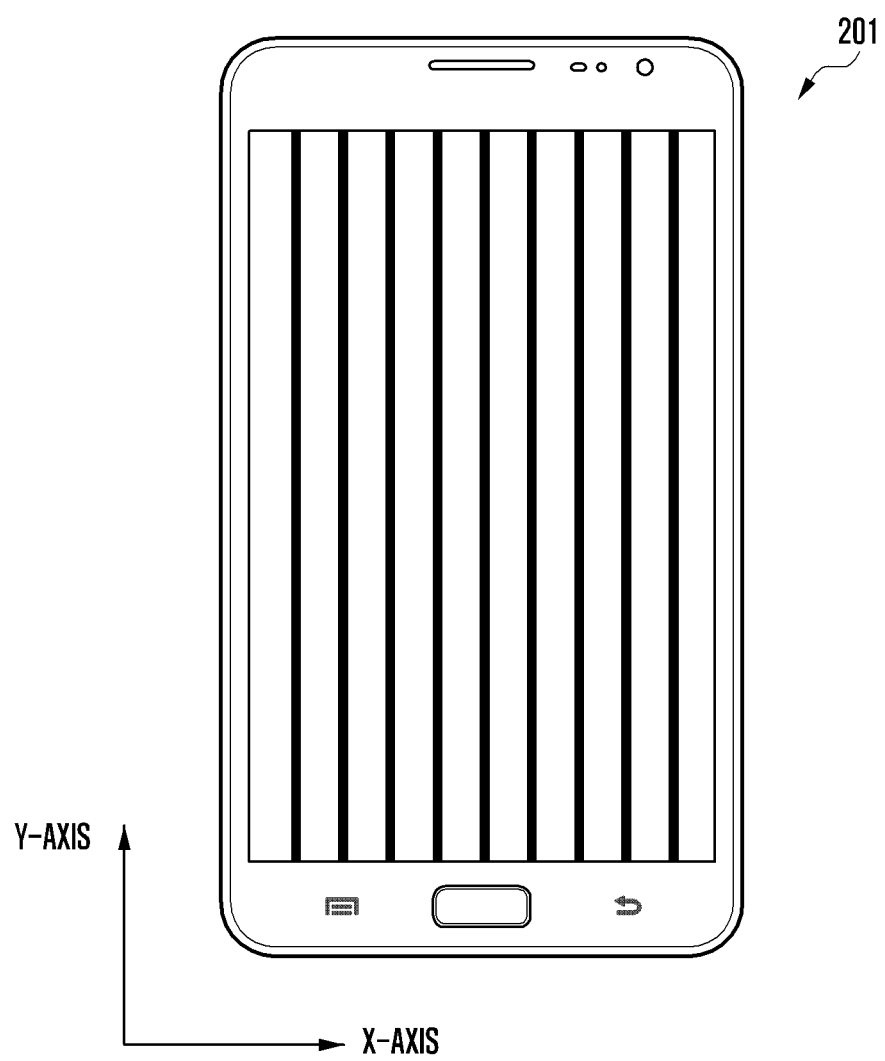
FIGS. 8A and 8B are diagrams illustrating an example of determining a view angle limit direction based on a screen direction of an electronic device according to various embodiments of the present disclosure.
Figure 8B:
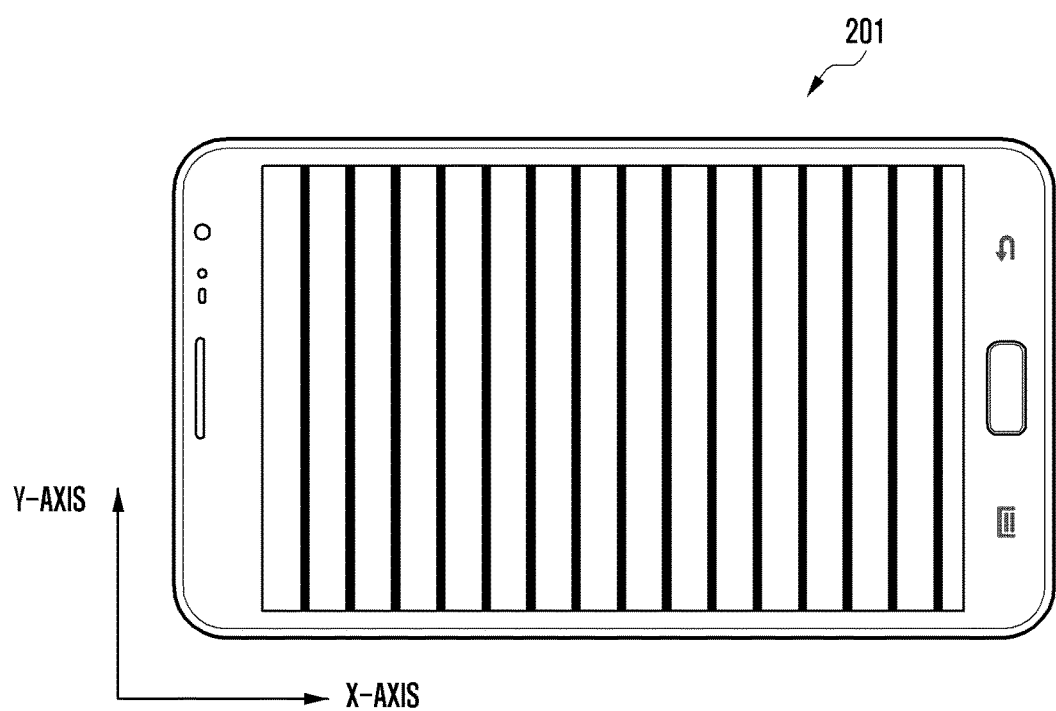

FIGS. 8A and 8B are diagrams illustrating an example of determining a view angle limit direction based on a screen direction of an electronic device according to various example embodiments of the present disclosure.

With reference to FIG. 8A, the electronic device 201 may be located in the vertical direction (e.g., portrait mode). The processor 210 of the electronic device 201 can identify that the electronic device 201 is displaying a screen in a vertical direction using the sensor module 240 (for example, gyro sensor 240B, acceleration sensor 240E, and grip sensor 240F). Displaying a screen in a vertical direction may mean a state that the screen of the electronic device 201 is displayed in the Y-axis direction as illustrated in FIG. 8A. The processor 210 can determine a view angle limit direction based on the vertical direction and control light scattering in a specific area of a view angle limit panel corresponding to the determined view angle limit direction. The view angle limit panel may be included in the display 260 of the electronic device 201. With reference to FIG. 8A, the processor 210 can control light scattering in a specific area of the view angle limit panel corresponding to the Y-axis direction in the portrait mode. The specific area of the view angle limit panel may include a plurality of areas and disposed at predetermined intervals based on the X-axis direction. The processor 210 can control so that a specific area of the view angle limit panel is disposed at predetermined intervals corresponding to the X-axis direction and light is scattered in the specific area. According to various embodiments of the present disclosure, persons located at the right or left side of the first user can hardly identify the screen of the electronic device 201 because of light scattering in a specific area of the view angle limit panel corresponding to the Y-axis direction. Namely, according to various embodiments of the present disclosure, the view angle can be limited for another person located at the right or left side of the user. In various embodiments of the present disclosure, a level of light scattering can be controlled for a specific area of the view angle limit panel. For example, if the level of light scattering for the specific area of the view angle limit panel becomes higher, a range of limiting the view angle becomes wider. In various embodiments of the present disclosure, the transparency of a screen can be adjusted by adjusting the level of light scattering.

With reference to FIG. 8B, the electronic device 201 may be located in the horizontal direction (e.g., landscape mode). The processor 210 of the electronic device 201 can identify that the screen of the electronic device 201 is located in a horizontal direction using the sensor module 240. Locating the screen of the electronic device 201 in the horizontal direction may mean a state that the screen of the electronic device 201 is displayed in the X-axis direction as shown in FIG. 8B. The processor 210 can determine a view angle limit direction based on the horizontal direction and control light scattering in a specific area of the view angle limit panel corresponding to the determined view angle limit direction. With reference to FIG. 8B, the processor 210 can control light scattering in a specific area of the view angle limit panel corresponding to the Y-axis direction in the landscape mode. The specific area of the view angle limit panel may be configured with a plurality of areas and disposed at predetermined intervals based on the X-axis direction. The processor 210 can dispose the specific area of the view angle limit panel based on the predetermined intervals corresponding to the X-axis direction and control light scattering in the specific area. Similarly to the portrait mode shown in FIG. 8A, according to various embodiments of the present disclosure, another person located at the right or left side of the user can hardly identify the screen of the electronic device 201 because the specific area is displayed opaquely corresponding to the Y-axis direction. Namely, according to various embodiments of the present disclosure, the view angle can be limited for another person located at the right or left side of the user. According to various embodiments of the present disclosure, the level of light scattering in a specific area of the view angle limit panel can be controlled. For example, if the level of light scattering in a specific area of the view angle limit panel becomes higher, a range of limiting the view angle becomes wider. In various embodiments of the present disclosure, the transparency of a screen can be adjusted by adjusting the level of light scattering.

Figure 9:
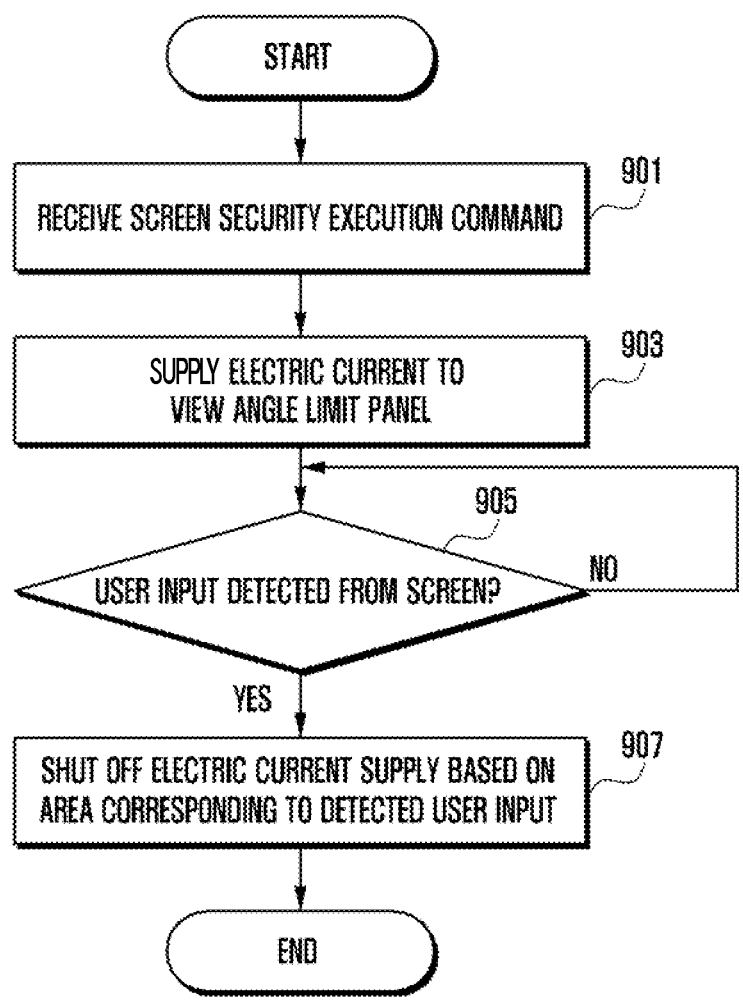
FIG. 9 is a flowchart illustrating an example method for disabling a screen security function in an area corresponding to a user input while executing the screen security function according to various example embodiments of the present disclosure.

FIG. 9 is a flowchart illustrating an example method for disabling a screen security function in an area corresponding to a user input while executing the screen security function according to various example embodiments of the present disclosure.

With reference to FIG. 9, the processor 210 of the electronic device 201 receives a screen security execution command at operation 901. The processor 210 controls the power supply unit to supply an electric current to a view angle limit panel at operation 903. Namely, the processor 210 can control the view angle limit panel to scatter light by supplying an electric current to the view angle limit panel. The processor 210 can control light scattering for the whole view angle limit panel or for a partial area of the view angle limit panel.

The processor 210 detects a user input through a screen at operation 905. For example, the processor 210 can detect a user input through a touch panel 252 included in an input device 250. If a user input is detected, the processor 210 can identify coordinates of the user input. Here, the user input may be a touch input of contacting the touch panel 252 or a hovering input.

If a user input is detected through the screen at operation 905, the processor 210 shuts off the supply of electric power in an area corresponding to the detected user input at operation 907. In more detail, the processor 210 can identify coordinates corresponding to the user input. The processor 210 can identify an area corresponding to the user input based on the coordinates having a predetermined distance from the identified coordinates. The predetermined distance may be set by a developer or a user. The processor 210 can shut off the electric current for an area corresponding to the identified user input. Namely, the processor 210 can detect the user input through the screen and shut off the electric current so that light can pass through the area corresponding to the user input. The processor 210 can shut off the electric current being supplied to the area only for the moment of detecting the user input or for a predetermined time after detecting the user input.

According to various embodiments of the present disclosure, a user input is detected in a state that an electric current is supplied to a view angle limit panel and light passing the view angle limit panel is scattered (e.g., state that a screen security function is executed), and the electric current can be shut off for an area corresponding to the detected user input. Namely, the screen security function can be disabled for an area where the user input is detected.

According to another embodiment of the present disclosure, the operations 603 to 607 of FIG. 6 can be performed between the operations 901 and 903. According to another embodiment of the present disclosure, a screen direction of the electronic device can be identified, a view angle limit direction can be determined based on the screen direction, and an electric current can be supplied to the view angle limit panel based on the determined view angle limit direction. Namely, the electronic device according to another embodiment can perform a screen security function based on the view angle limit direction. Further, according to another embodiment, a user input can be detected in a state of executing a screen security function, and an electric current can be shut off for an area corresponding to the detected user input. Namely, the screen security function can be disabled for an area where a user input is detected.

Figure 10:
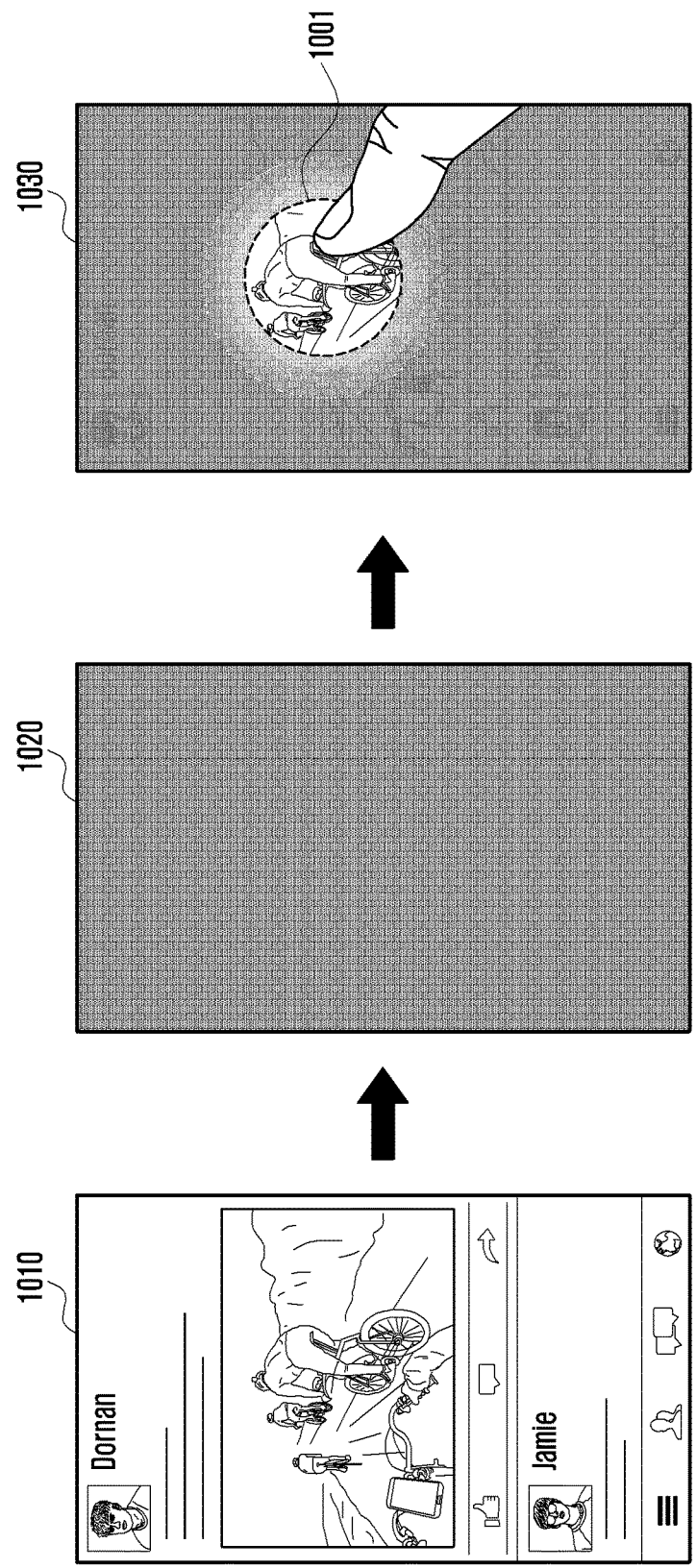
FIG. 10 is a diagram illustrating an example procedure of disabling a screen security function in an area corresponding to a user input while executing the screen security function according to various example embodiments of the present disclosure.

FIG. 10 is a diagram illustrating an example procedure of disabling a screen security function in an area corresponding to a user input while executing the screen security function according to various example embodiments of the present disclosure.

FIG. 10 illustrates a screen of an electronic device 201. The processor 210 can display an image in a display 260 as shown by screen 1010. The processor 210 can supply an electric current to a view angle limit panel based on a screen direction of the electronic device 201 in response to a screen security execution command as shown by screen 1020. If the electric current is supplied to the view angle limit panel, the display 260 of the electronic device 201 may become opaque as shown by screen 1020. In screen 1020, the processor 210 may be in a state of executing a screen security function. The processor 210 can detect a user input through a touch panel 252 as shown by screen 1030. The processor 210 can shut off the electric current for a specific area corresponding to the detected user input. Namely, the processor 210 can disable the screen security function for the specific area corresponding to the user input. The processor 210 can release an opaque display of a specific area corresponding to the detected user input. When releasing the opaque display, the processor 210 can determine an opacity according to a user setting.

According to various example embodiments of the present disclosure, the screen security function can be disabled for a partial area of the screen desired by a user. According to various embodiments of the present disclosure, an opaque display can be released gradually when disabling the screen security function for a partial area where a user input is detected. According to various embodiments of the present disclosure, a level of releasing an opaque display part can be set by a user.

A method of operating an electronic device having a display unit including a view angle limit panel disposed on a display panel, a sensor unit, and a processor according to various embodiments of the present disclosure may include the operations of receiving a screen security execution command, identifying a direction of the electronic device using the sensor unit functionally connected to the processor, determining a view angle limit direction based on the identified direction of the electronic device using the processor, and supplying an electric current to the view angle limit panel based on the determined view angle limit direction using the view angle limit panel functionally connected to the processor.

The method according to various embodiments of the present disclosure can supply the electric current to a specific area of the view angle limit panel corresponding to the Y-axis direction based on the identified direction of the electronic device.

The specific area of the view angle limit panel according to various embodiments of the present disclosure may include a plurality of areas which are disposed at regular intervals corresponding to the X-axis direction.

The view angle limit panel according to various embodiments of the present disclosure may include a plurality of liquid crystal molecules arranged in a certain direction if the electric current is supplied.

In the method according to various embodiments of the present disclosure, the display unit may further comprise a touch panel. The method may further include the operations of detecting a user input through the touch panel in a state that an electric current is supplied to the view angle limit panel and shutting off the electric current supplied to a point corresponding to the detected user input.

The method according to various embodiments of the present disclosure can identify coordinates corresponding to the user input and identify an area having a predetermined radius with the identified coordinates as the center.

The method according to various embodiments of the present disclosure may further include the operation of re-supplying the electric current if or after a predetermined time has elapsed after shutting off the electric current supplied to a point corresponding to the user input.

At least part of the device (e.g., modules or functions thereof) or method (e.g., operations) according to various example embodiments may be implemented as commands stored, e.g., in the form of program module (e.g., including program elements), in a computer-readable storage medium. In case commands are executed by at least one processor, this processor may perform a particular function corresponding to the commands. The computer-readable storage medium may be, for example, the memory. At least some of the program module may be implemented (e.g., executed) by, for example, the processor. At least some of the program module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices specially configured to store and perform a program instruction. In addition, the program instructions may include high level language codes, which can be executed in a computer by using an interpreter, as well as machine codes made by a compiler. The aforementioned hardware device may be configured to operate as one or more software modules in order to perform the operation of various embodiments of this disclosure, and vice versa.

A module or programming module according to various example embodiments may include or exclude at least one of the above-discussed elements or further include any other element. The operations performed by the module, programming module or any other element according to various embodiments may be executed sequentially, in parallel, repeatedly, or by a heuristic method. Additionally, some operations may be executed in different orders or omitted, or any other operation may be added.

While the present disclosure has been particularly illustrated and described with reference to an example embodiment thereof, it will be understood by those skilled in the art that various changes in form and details may be made therein without departing from the spirit and scope of the disclosure as defined by the appended claims.

What is claimed is:

1. An electronic device comprising:
   a display comprising a view angle limit panel disposed on a display panel;
   at least one sensor configured to identify an orientation of a screen displayed on the display of the electronic device; and
   at least one processor operationally connected to the display and the at least one sensor, wherein the at least one processor is configured to:
   identify, in response to a screen security execution command, the orientation of the screen displayed on the display of the electronic device based on the at least one sensor,
   determine a view angle limit direction corresponding to the identified orientation of the screen of the electronic device, and
   supply an electric current to the view angle limit panel based on the determined view angle limit direction.

2. The electronic device of claim 1, wherein the at least one processor is configured to supply the electric current to a specific area of the view angle limit panel corresponding to a Y-axis direction based on the identified orientation of the screen displayed on the display of the electronic device.

3. The electronic device of claim 2, wherein the specific area of the view angle limit panel includes a plurality of areas disposed at regular intervals corresponding to an X-axis direction.

4. The electronic device of claim 1, wherein the view angle limit panel comprises a plurality of liquid crystal molecules arranged in a predetermined direction if the electric current is supplied.

5. The electronic device of claim 1, wherein the view angle limit panel comprises a polymer dispersed liquid crystal (PDLC).

6. The electronic device of claim 1,
   the display further comprising a touch panel,
   wherein the at least one processor is further configured to:
   detect a touch input through the touch panel of the display, and
   shut off the electric current supplied to a point corresponding to the detected touch input.

7. The electronic device of claim 6, wherein the at least one processor is configured to identify coordinates of the touch input and to shut off the electric current corresponding to the identified coordinates.

8. The electronic device of claim 7, wherein the at least one processor is configured to identify an area having a predetermined radius from the identified coordinates as a center and to shut off the electric current corresponding to the identified area.

9. The electronic device of claim 7, wherein the at least one processor is configured to shut off the electric current corresponding to the identified coordinates and to re-supply the electric current if a predetermined time has elapsed.

10. A method of operating an electronic device, the method comprising:
- identifying, in response to receiving a screen security execution command, an orientation of a screen displayed on a display of the electronic device based on at least one sensor of the electronic device;
- determining a view angle limit direction corresponding to the identified orientation of the screen of the electronic device; and
- supplying an electric current to a view angle limit panel disposed on a display panel of the display, based on the determined view angle limit direction.

11. The method of claim 10, wherein the supplying an electric current to the view angle limit panel comprises supplying the electric current to a specific area of the view angle limit panel corresponding to a Y-axis direction based on the identified orientation of the electronic device.

12. The method of claim 11, wherein the specific area of the view angle limit panel includes a plurality of areas disposed at regular intervals corresponding to an X-axis direction.

13. The method of claim 10, wherein the view angle limit panel comprises a plurality of liquid crystal molecules arranged in a predetermined direction if the electric current is supplied.

14. The method of claim 10, wherein the display further comprises a touch panel, the method further comprising:
- detecting touch input through the touch panel of the display in a state that an electric current is supplied to the view angle limit panel; and
- shutting off the electric current supplied to a point corresponding to the detected touch input.

15. The method of claim 14, wherein the identifying a point corresponding to the detected input comprises:
- identifying coordinates corresponding to the touch input; and
- identifying an area having a predetermined radius from the identified coordinates as a center.

16. The method of claim 14, further comprising:
- re-supplying the electric current if a predetermined time has elapsed after shutting off the electric current supplied to a point corresponding to the input.

* * * * *